United States Patent
Dewarrat

(10) Patent No.: US 7,729,862 B2
(45) Date of Patent: Jun. 1, 2010

(54) FREQUENCY AUTONORMALISATION RESERVOIR MAPPING

(75) Inventor: Rodolphe Dewarrat, Zürich (CH)

(73) Assignee: Spectraseis AG, Züich (CH)

( * ) Notice: Subject to any disclaimer, the term of this patent is extended or adjusted under 35 U.S.C. 154(b) by 0 days.

(21) Appl. No.: 11/751,659

(22) Filed: May 22, 2007

(65) Prior Publication Data

US 2007/0299614 A1    Dec. 27, 2007

Related U.S. Application Data

(60) Provisional application No. 60/804,420, filed on Jun. 9, 2006, provisional application No. 60/806,455, filed on Jun. 30, 2006, provisional application No. 60/866,152, filed on Nov. 16, 2006.

(51) Int. Cl.
*G01V 1/00* (2006.01)
*G01V 1/28* (2006.01)

(52) U.S. Cl. .......................................... 702/14; 702/16

(58) Field of Classification Search ............. 702/14–16, 702/18, 75–77, 66–68, 13; 367/38, 47, 49; 324/76.19, 76.21, 76.22
See application file for complete search history.

(56) References Cited

U.S. PATENT DOCUMENTS

| | | | | |
|---|---|---|---|---|
| 4,587,641 A | * | 5/1986 | DiFoggio | 367/30 |
| 6,131,071 A | * | 10/2000 | Partyka et al. | 702/16 |
| 6,442,489 B1 | | 8/2002 | Gendelman et al. | |
| 6,473,695 B1 | | 10/2002 | Chutov et al. | |
| 7,539,578 B2 | * | 5/2009 | Saenger | 702/14 |
| 7,590,491 B2 | * | 9/2009 | Saenger | 702/14 |
| 7,606,691 B2 | * | 10/2009 | Calvert et al. | 703/10 |
| 7,676,326 B2 | * | 3/2010 | Podladchikov et al. | 702/11 |
| 2006/0155476 A1 | * | 7/2006 | Abma | 702/14 |
| 2008/0002523 A1 | * | 1/2008 | Podladchikov et al. | 367/49 |
| 2008/0021655 A1 | * | 1/2008 | Saenger | 702/13 |
| 2008/0021656 A1 | * | 1/2008 | Saenger | 702/13 |
| 2008/0288173 A1 | * | 11/2008 | Saenger | 702/16 |
| 2009/0187347 A1 | * | 7/2009 | Saenger | 702/16 |

FOREIGN PATENT DOCUMENTS

| | | | |
|---|---|---|---|
| GB | 2 154 320 A | | 9/1985 |
| WO | WO 2006/011826 | * | 2/2006 |
| WO | WO 2007/141725 | * | 12/2007 |
| WO | 2008/059450 | * | 5/2008 |

OTHER PUBLICATIONS

Holzner et al., "Applying microtremor analysis to identify hydrocarbon reservoirs", first break vol. 23, May 2005, pp. 3-8.*

(Continued)

*Primary Examiner*—Michael P Nghiem

(57) ABSTRACT

A method of locating subsurface hydrocarbon reservoirs includes acquiring seismic data, dividing the seismic data into time windows, applying a data transform to the seismic data having a plurality of components to obtain a smoothed frequency spectrum, selecting one or more local maxima and minima, determining a frequency product as a function of the maxima and minima in a form for display. Lower and higher ratio thresholds may be selected to further discriminate frequency product selection for display. A display or map of frequency products over a survey area may indicate the presence of subsurface fluid reservoirs.

20 Claims, 8 Drawing Sheets

OTHER PUBLICATIONS

Reza Daneshvar M et al: "Passive seismic imaging using microearthquakes" in Geophysics, Soc. of Expl. Geophys., Tulsa, OK, US, vol. 60, No. 4, Jul. 1, 1995, pp. 1178-1186, XP000521164, ISSN: 0016-8033 the whole document.

Artman B.: "Imaging passive seismic data" Geophysics, SEG, vol. 71, No. 4, Jul. 2006-Aug. 2006 pp. 1177-1187, XP002479903 the whole document.

* cited by examiner

FREQUENCY AUTONORMALISATION RESERVOIR MAPPING

CROSS-REFERENCE TO RELATED APPLICATION

This application claims the benefit of U.S. Provisional Application No. 60/804,420 filed 9 Jun. 2006, U.S. Provisional Application No. 60/806,455 filed 30 Jun. 2006 and U.S. Provisional Application No. 60/866,152 filed 16 Nov. 2006.

BACKGROUND OF THE DISCLOSURE

1. Technical Field

The disclosure is related to seismic exploration for oil and gas, and more particularly to processing and displaying data.

2. Description of the Related Art

Seismic exploration for hydrocarbons is conducted using a source of seismic energy and receiving and recording the energy generated by the source using seismic detectors. On land, the seismic energy source may be an explosive charge or another energy source having the capacity to impart impacts or mechanical vibrations at or near the earth's surface. Seismic waves generated by these sources travel into the earth's subsurface and are reflected back from strata boundaries and reach the surface of the earth at varying intervals of time depending on the distance traveled and the characteristics of the subsurface material traversed. The return waves are detected by the sensors and representations of the seismic waves as representative electrical signals are recorded for processing into images.

Normally, signals from sensors located at varying distances from the source are added together during processing to produce "stacked" seismic traces. In marine seismic surveys, the source of seismic energy is typically air guns. Marine seismic surveys typically employ a plurality of sources and/or a plurality of streamer cables, in which seismic sensors are mounted, to gather three dimensional data.

The process of exploring for and exploiting subsurface hydrocarbon reservoirs is often costly and inefficient because operators have imperfect information from geophysical and geological characteristics about reservoir locations. Furthermore, a reservoir's characteristics may change as it is produced.

Geophysical and geological methods are used to determine well locations. Expensive exploration investment is often focused in the most promising areas using relatively slow methods, such as reflection seismic data acquisition and processing. The acquired data are used for mapping potential hydrocarbon-bearing areas within a survey area to optimize exploratory well locations and to minimize costly non-productive wells.

The time from mineral discovery to production may be shortened if the total time required to evaluate and explore a survey area can be reduced by applying selected methods alone or in combination with other geophysical methods. Some methods may be used as a standalone decision tool for oil and gas development decisions when no other data is available.

Geophysical and geological methods are used to maximize production after reservoir discovery as well. Reservoirs are analyzed using time lapse surveys (i.e. repeat applications of geophysical methods over time) to understand reservoir changes during production.

Data acquisition for oil exploration may have a negative impact on the environment. The impact of oil exploration methods on the environment may be reduced by using low-impact methods and/or by narrowing the scope of methods requiring an active source, including reflection seismic and electromagnetic surveying methods.

Various geophysical data acquisition methods have a relatively low impact on field survey areas. Low-impact methods include gravity and magnetic surveys that maybe used to enrich or corroborate structural images and/or integrate with other geophysical data, such as reflection seismic data, to delineate hydrocarbon-bearing zones within promising formations and clarify ambiguities in lower quality data, e.g. where geological or near-surface conditions reduce the effectiveness of reflection seismic methods.

SUMMARY

In one embodiment a method of locating subsurface hydrocarbon reservoirs includes acquiring seismic data, dividing the seismic data into time windows, decomposing the seismic data to obtain a data spectrum, selecting a first local amplitude minimum of the data spectrum and an adjacent local amplitude maximum, multiplying the local amplitude value maximum by a function of the local amplitude minimum to obtain a frequency product and recording the frequency product in a form for display.

In another embodiment a method of processing seismic data includes decomposing seismic data to obtain a spectral component over a selected frequency range. For the spectral component a local amplitude maximum and a first adjacent local amplitude minimum are selected. The local amplitude value maximum is multiplied by a function of the first adjacent local amplitude minimum to obtain a frequency-ratio pair and recorded in a form for display.

In another embodiment an information handling system for mapping an area associated with seismic data includes a processor configured to decompose seismic data to obtain a spectral component over a selected frequency range and is configured to multiply a local amplitude value maximum of the spectral component over a selected frequency range by a function of a first adjacent local amplitude minimum to obtain a frequency-ratio pair.

In another embodiment a set of application program interfaces are embodied on a machine readable medium for execution by a processor in conjunction with an application program for processing seismic data. The interfaces include a first interface that receives frequency-ratio data representative of a local amplitude value maximum of a spectral component of seismic data multiplied by a function of a first adjacent local amplitude minimum of the spectral component. A second interface receives the frequency-ratio data to determine broad peak frequency location of frequency-ratio pair data.

DETAILED DESCRIPTION

Figure 1:
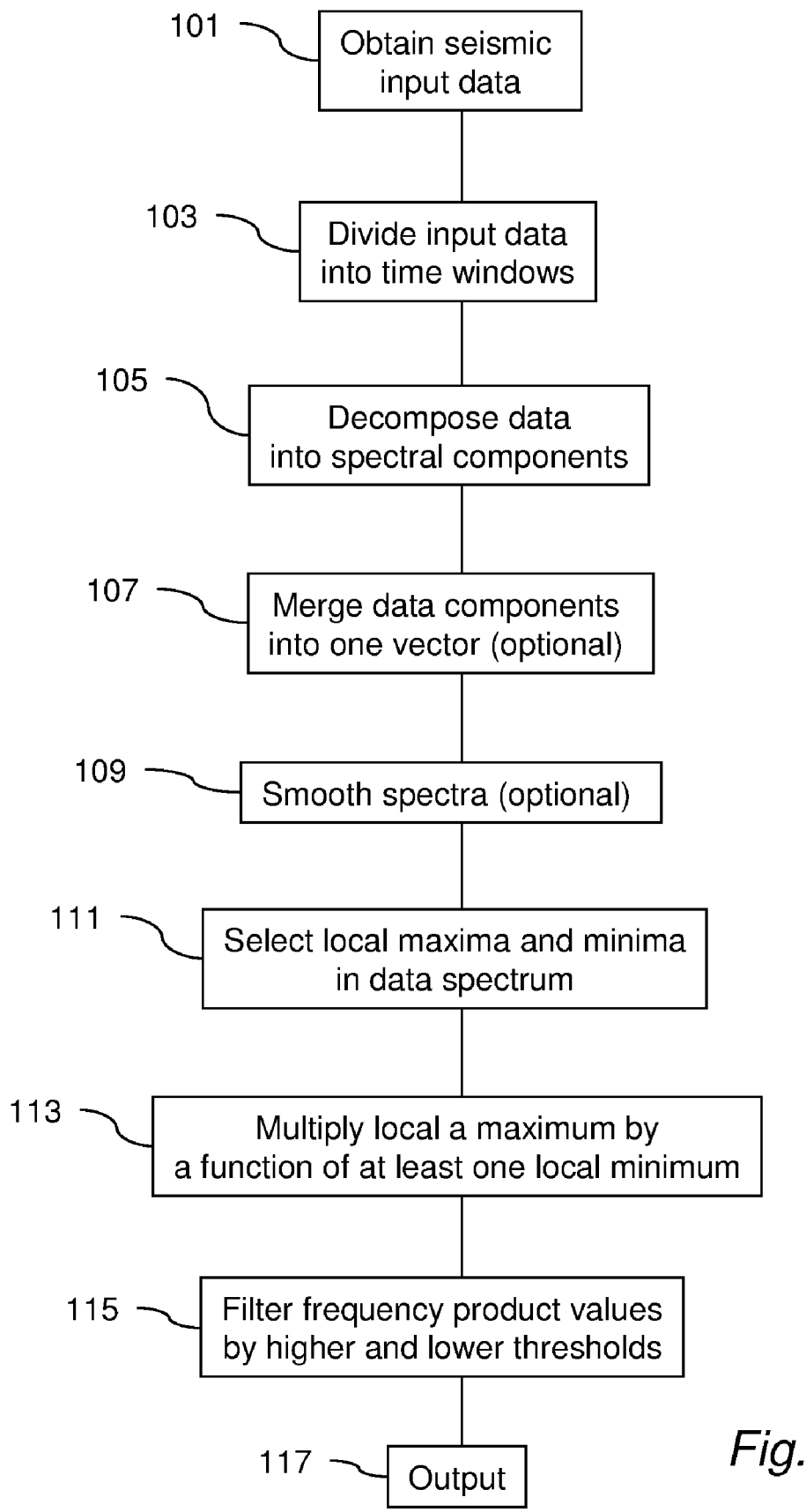
FIG. 1 is a schematic illustration of a method according to an embodiment of the present disclosure for calculating a frequency product.

Information to enable the direct detection of hydrocarbon reservoirs may be extracted from naturally occurring seismic waves and vibrations measured at the earth's surface. These naturally occurring waves may be measured using passive seismic data acquisition methods. Peaks and troughs (local minima and maxima) in the spectral ratio at various frequencies may be used to form an indicator for the presence of hydrocarbon reservoirs. Local maxima and minima of relatively low frequencies (0 to 20 Hz) in the seismic data spectral ratios may be used as an indicator for hydrocarbon reservoirs.

Low-impact survey methods like passive seismic data acquisition may be used for reconnaissance in frontier exploration areas, to monitor reservoirs over the productive life of a field or to cost-effectively upgrade data room information to generate higher license bids. Specific applications for passive seismic data include monitoring fluid flow, estimating shear-wave velocities, site zonation and shear-wave amplification studies for earthquake hazard surveys, monitoring hydraulic fracturing during reservoir stimulation and inversion for earth structure.

Passive seismic data acquisition methods rely on seismic energy from sources not directly associated with the data acquisition. In passive seismic monitoring there is no actively controlled and triggered source. Examples of sources recorded that may be recorded with passive seismic acquisition are microseisms (e.g., rhythmically and persistently recurring low-energy earth tremors), microtremors and other ambient or localized seismic energy sources.

Microtremors are attributed to the background energy present in the earth that may be due to non-seismic sources. Microtremor seismic waves may include sustained seismic signals within a limited frequency range. Microtremor signals, like all seismic waves, contain information affecting spectral signature characteristics due to the media or environment that the seismic waves traverse. These naturally occurring relatively low frequency background seismic waves (sometimes termed noise or hum) of the earth may be generated from a variety of sources, some of which may be indeterminate.

Survey results from passive seismic surveying demonstrate that the spectral characteristics of microtremor seismic waves often contain relevant information for direct hydrocarbon detection. These frequencies are below the sound audible to humans and nominally include frequencies under 20 Hz.

Direct hydrocarbon reservoir indicators may be extracted using spectral analysis of microtremors. Microtremor analysis provides a method for identification and mapping of fluid reservoirs or reservoir related parameters directly from data acquired near the earth's surface in land and marine areas using naturally occurring seismic background waves. Collected over time these data highlight changes in reservoir parameters.

Microtremor analysis allows for direct determination of a hydrocarbon reservoir independent of the reservoir structure. Additionally, the thickness of strata associated with a hydrocarbon reservoir may be determined or inferred from microtremor analysis.

One or more sensors are used to measure vertical and horizontal components of motion due to background seismic waves at multiple locations within a survey area. These components may be measured separately or in combination and may be recorded as signals representing displacement, velocity, and/or acceleration.

The sensors may measure the components of motion simultaneously or asynchronously. As the spectra and the spectral ratios of the acquired signal for any location may be quite stable over time, the components of motion do not need to be measured simultaneously. This may be especially applicable in areas with relatively low local ambient noise and for data acquired over relatively short time periods (e.g., a few weeks). Spectra determined from asynchronous components at a location may be used as it is the relative difference of spectral components as opposed to specific contemporaneous differences that may be indicative of reservoir characteristics.

Geophysical survey local conditions may affect a method's results. In many cases the spectra based methods provide reliable direct hydrocarbon indicators; in other cases a skilled operator can use the results to improve their interpretation of other geological and geophysical data and generate an improved subsurface model allowing for more efficient exploration and production decisions.

The sensor equipment for measuring seismic waves may be any type of seismometer. Seismometer equipment having a large dynamic range and enhanced sensitivity compared with other transducers may provide the best results (e.g., multi-component earthquake seismometers). A number of commercially available sensors utilizing different technologies may be used, e.g. a balanced force feed-back instrument or an electrochemical sensor. An instrument with high sensitivity at very low frequencies and good coupling with the earth enhances the efficacy of the method.

Ambient noise conditions representative of seismic waves that may have not traversed subsurface reservoirs can negatively affect the recorded data. Techniques for removing unwanted artifacts and artificial signals from the data, such as cultural and industrial noise, are important for applying this method successfully in areas where there is high ambient noise.

Embodiments of the present procedures have several advantages over conventional seismic data acquisition for exploration including that the techniques do not require an artificial seismic source, such as an explosion, mechanically generated vibration or electric current. Additionally, the results from spectral analysis are repeatable and the results may be correlated to hydrocarbon accumulations. There is little or no environmental impact due to data acquisition. The method is applicable for land, transition zones and marine areas. The method has application in areas where higher frequencies are greatly affected by geological conditions, e.g. in areas where soft soil layers attenuate high-frequency seismic signals or salt formations scatter higher frequencies.

FIG. 1 is a schematic illustration of a method according to an embodiment of the present disclosure using passively acquired seismic data to determine a spectral ratio related to direct indications of hydrocarbons. The embodiment, which may include one or more of the following referenced components illustrated or discussed herein (in any order), is a method of locating subsurface anomalies related to hydrocarbon accumulations includes obtaining seismic data having a plurality of components 101. The acquired data may be time stamped and include multiple data vectors. An example is multicomponent earthquake seismometry data. The multiple data vectors may each be associated with an orthogonal direction of movement. Data may be acquired in orthogonal component vectors arbitrarily designated east, north and depth (respectively, Ve, Vn and Vz) or designated $V_x$, $V_y$ and $V_z$ according to desired convention. The data vectors may all be the same length and synchronized.

The vector data may be divided into time windows 103 for processing. Window lengths may be between half a minute and an hour. Alternatively, window lengths may be greater than ten times the period of the lowest frequency of interest. For example if the frequency of interest has a period around 7 seconds all the windows may be at least 70 seconds long. However, the length of time windows for analysis may be chosen to accommodate processing or operational concerns.

A data transform may be applied to decompose data 105 into spectral components. Seismic data frequency content varies with time. Time-frequency decomposition (spectral decomposition) of a seismic signal enables analysis and characterization of the signal time-dependent frequency response due to subsurface materials and reservoir parameters.

Various data transformations or decompositions are useful for time-frequency analysis of seismic signals, such as continuous or discrete Fourier or wavelet transforms. Examples include without limitation the classic Fourier transform or one of the many continuous Wavelet transforms (CWT) or discreet Wavelet transforms. Examples of other transforms include Haar transforms, Haademard transforms and wavelet transforms. The Morlet wavelet is an example of a wavelet transform that may be applied to seismic data. Wavelet transforms have the attractive property that the corresponding expansion may be differentiable term by term when the seismic trace is smooth. Additionally, signal analysis, filtering, and suppressing unwanted signal artifacts may be carried out efficiently using transforms applied to the acquired data signals.

One or more orthogonal components of the acquired data may be merged, for example the horizontal data components 107. Horizontal components Ve and Vn may be merged by any of several ways including a root-mean-square average so that horizontal component H may be defined as $H=\sqrt{(V_e^2+V_n^2)/2}$. Whether merging data components is undertaken before or after a data transform is applied to the data is a matter of choice.

Additionally the spectra may be smoothed using a moving average 109. The smoothing parameter defines how many values to input for calculating an averaged value. A large smoothing parameter leads to strong smoothing and a small smoothing parameter leads to less smoothing. Examples of the number of values for a smoothing parameter may range between 10 and 500, but will be case dependent. A smoothing parameter for a flow may be selected at the beginning of a processing flow for application prior to calculating a spectral ratio.

Figure 2:
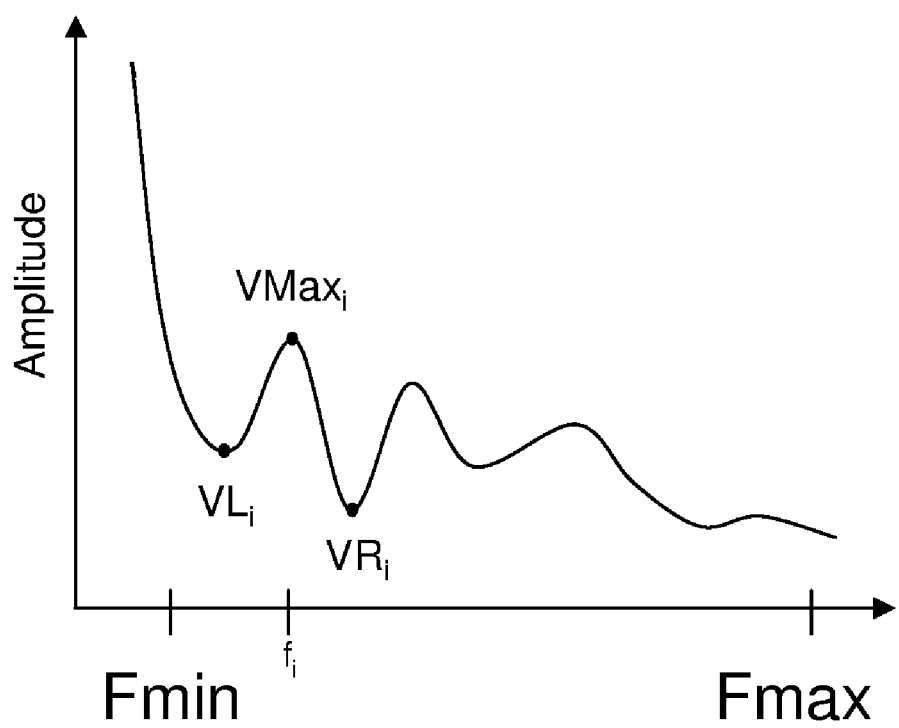
FIG. 2 illustrates a schematic example of a smoothed frequency spectrum.

A local maximum and at least one local minimum is selected 111 based on the data frequency spectrum (see FIG. 2). The horizontal component may be a combination of the measured horizontal components (as in 107). These spectra may be averaged over time windows 113. Averaging over time windows may be by arithmetic mean or geometric mean. The frequency product values may be filtered 115 or selected for inclusion into a map or display data set by whether the values are above a lower threshold and below a higher threshold (see FIG. 3). The results after this processing may be output 117 in a form for mapping or other display. Maps of this frequency product output for selected frequencies (usually where values cluster together where "peaks" approach the higher threshold, see 306 in FIG. 3) may provide direct indications of the geographical extent of hydrocarbon reservoirs in the field survey vicinity.

FIG. 2 illustrates a smoothed frequency spectrum. Local frequency amplitude maximum $VMax_i$ is between local frequency minima $VL_i$ and $VR_i$. While a frequency product (r) may be formed as a ratio, for example VMax/VL or VMax/VR, the frequency product may also be formed as r=(VMax/((VL+VR)/2)). The frequency and frequency product may form a frequency-ratio pair ($f_i$, $r_i$) associated with the seismic campaign or survey position from which the underlying seismic data were acquired.

Figure 3:
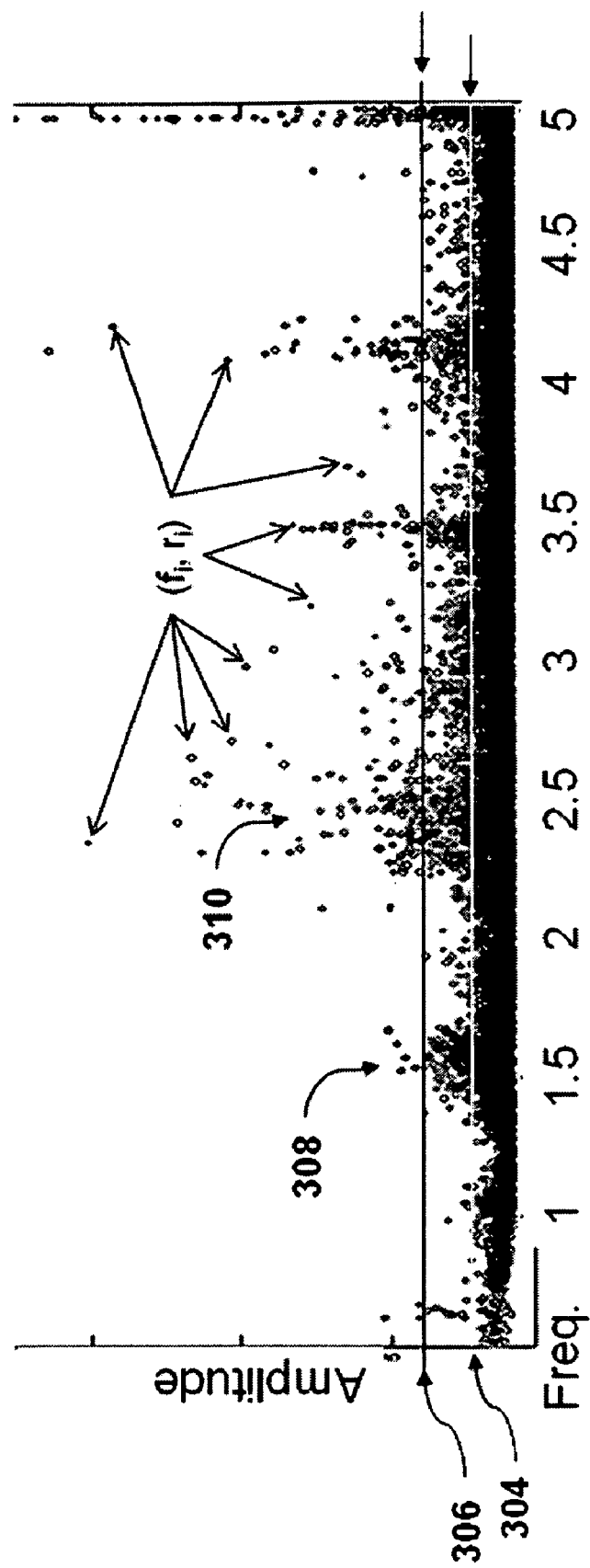
FIG. 3 illustrates a frequency versus amplitude value for a data set of frequency ratios.

All the frequency-ratio pairs ($f_i$, $r_i$) may be plotted together to form an autonormalized survey spectrum as illustrated in FIG. 3. The autonormalized spectrum illustrated in FIG. 3 is a combination of frequency products or ratio peaks (frequency-ratio pairs) that naturally separate into broadening peak areas that may tend to separate into generalized zones. Where these values cluster may be termed 'broad peaks.' A line 304 on the chart represents a "lower ratio threshold" with a nearly random distribution of peaks the line. Typical values for this lower line will be survey dependent. Line 306 in FIG. 3 represents a "higher ratio threshold" above which values may be ignored, recalculated or replaced. Values between these lower and higher selected thresholds, particular the broad peaks, may be analyzed and sorted depending on their broadening (relative to neighboring frequencies), on their frequency and other consideration related to data analysis (correlation length, duration, etc.).

Area 308 at approximately 1.6 Hz and 310 at approximately 2.6 Hz of FIG. 3 are examples of broad peaks. Once a broad peak is selected, all or a subset of the points associated with the frequency and frequency product values ($f_i$, $r_i$) maybe plotted on a map. Plotting and interpolating these amplitude values and their derivatives, typically minima, maxima, averages and others produces a map that may illustrate trends associated with subsurface features or conditions.

Figure 4:
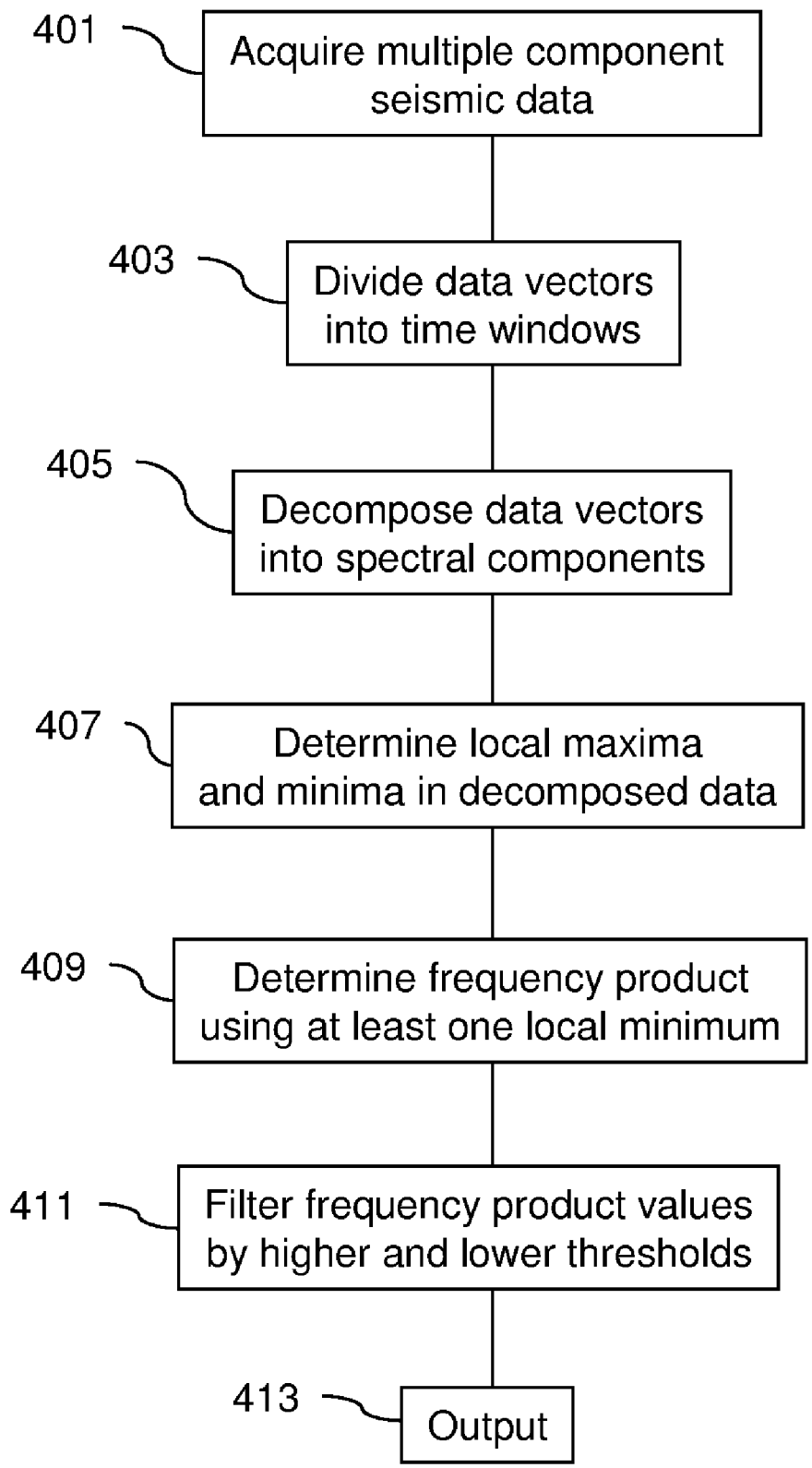
FIG. 4 illustrates a flow chart related to a to an embodiment of the present disclosure for subsurface hydrocarbon reservoir detection using a frequency product.

FIG. 4 illustrates another embodiment, which may include one or more of the following referenced components illustrated or discussed herein (in any order), for determining a possible extent of hydrocarbon accumulations in a subsurface reservoir. Seismic data that have a plurality of components 401 are acquired. The data may include a time stamp and orthogonal data vectors. The data vectors may be all same length and synchronized. Orthogonal components may represent two horizontal directions and a vertical direction. The data are divided into time windows 403. The time window length for data vectors may be chosen based on operational or processing considerations, and an example length may correspond to 10 cycles of the lower frequency range of interest. Horizontal data components may be merged, for example by averaging or by a root-mean-square weighting of the values.

As needed the data may be rotated to any desired reference frame. A reference frame where the vertical vector direction is normal to the geoid may be beneficial for subsequent processing. The spectra may be smoothed, for example with a moving average function. The data may be decomposed into spectral components 405 by Fourier or Wavelet transform.

Local maxima and minima are determined in the frequency spectrum 407. The frequency product for a frequency is determined using a local maximum and a local minimum 409. The frequency product values may be filtered 411 or selected for inclusion into a map or display by whether the values are above a lower threshold and below a higher threshold. The frequency product is then stored in a form for display 413 and/or formed into a map. A map created with the frequency product in frequency ranges where the values peak near a selected higher threshold, may give a direct indication of the geographical extent of subsurface hydrocarbon reservoirs.

Values between lower and higher selected thresholds may then be analyzed, sorted and plotted depending on parameters as outlined above.

In an alternative embodiment, passively acquired seismic data as input are divided into time windows, a Fast Fourier Transform (FFT) or other transform is applied to each component, orthogonal components are merged to obtain one component, the data are be smoothed, a spectral ratio is calculated and the spectra are averaged over discrete time ranges within time windows. The frequency data covers the frequency range of interest (e.g. from 0 to 20 Hz) by smoothed or equally spaced values. Example: 0, 0.1, 0.2, 0.3, . . . , 19.9, 20 (values in Hz). This alternative embodiment may be combined with methods illustrated in FIG. 1 and FIG. 4.

Figure 5:
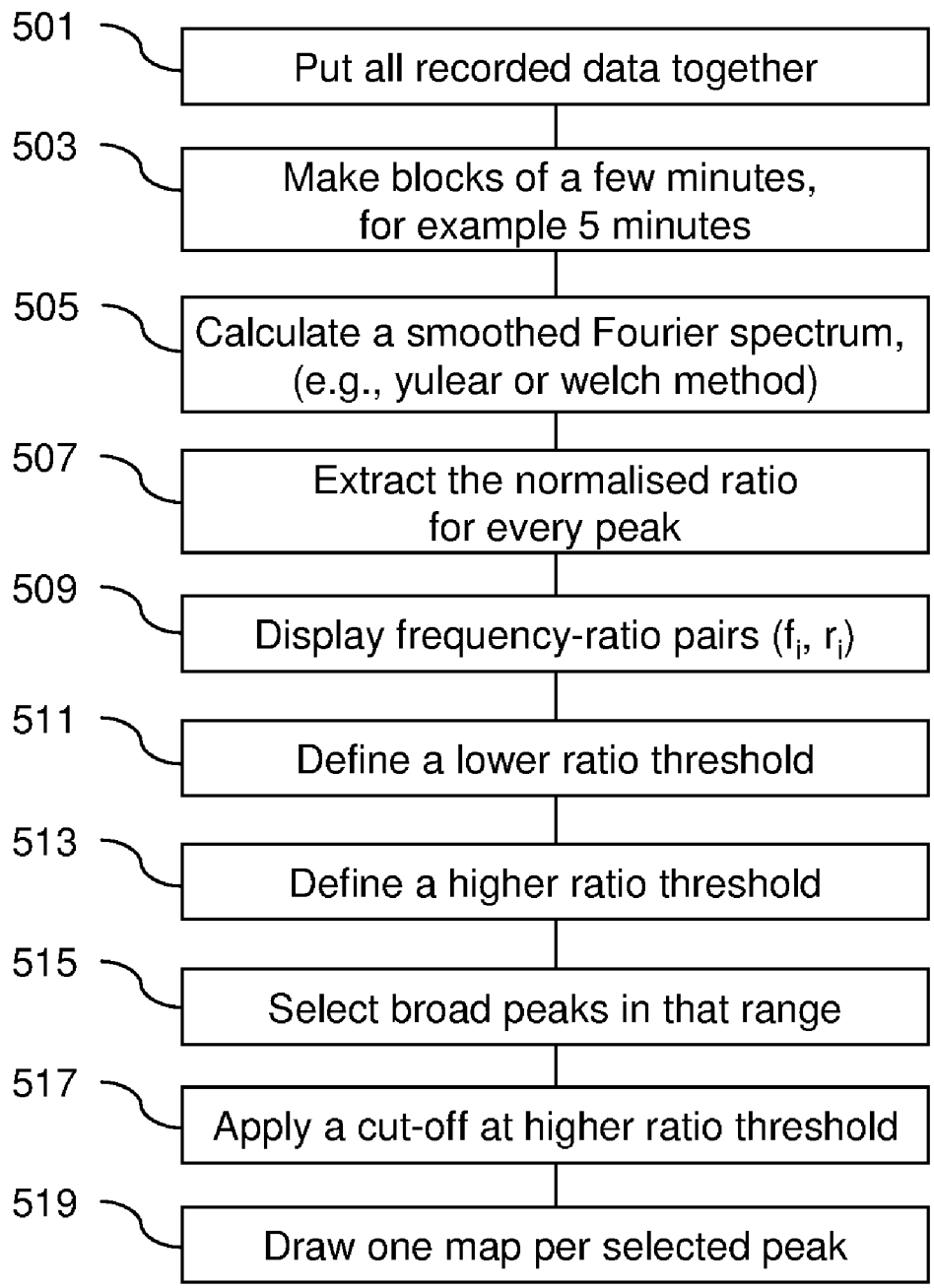
FIG. 5 illustrates a flow chart related to a method for seismic data processing according to an embodiment of the present disclosure for determining parameters related to subsurface hydrocarbon reservoir detection using a frequency product.

FIG. 5 illustrates another embodiment, which may include one or more of the following referenced components illustrated or discussed herein (in any order), for determining a possible extent of hydrocarbon accumulations in a subsurface reservoir. As illustrated in FIG. 5, recordings of seismic data 501 acquired in seismic data acquisition campaign are split into time intervals 503 of 0.5 to 60 minutes after any data conditioning performed. A Fourier-like or wavelet transformation 505 is applied to each interval to produce a smooth spectrum.

A normalised ratio is extracted 507 for each selected peak as follows: In a frequency interval defined below 20 Hz, spectral peaks and their maximum amplitude ($VMax_i$ as illustrated in FIG. 2) are selected. Then $VMax_i$ is multiplied by a function of one or both adjacent local minimums ($VL_i$ and $VR_i$), for example a multiplication by the inverse of the average of both values such as the function $f(n)=2/(VL_i+VR_i)$. The frequency of the peak and the result of this multiplication $VMax_i*f(n)$ produce a pair $(f_i,r_i)$ that can be plotted in a 2D chart. These pairs form the autonormalised campaign spectrum and may be displayed 509 for further analysis as illustrated in the example of FIG. 3. Additionally, more than one maximum $VMax_i$ may be combined together to calculate a ratio.

This autonormalised spectrum is a combination of peaks with various broadening that separate themselves above a so-called lower ratio threshold 511 (e.g., 304 of FIG. 3) where values are nearly randomly distributed. Very high values above a so-called higher ratio threshold 513 (e.g., 306 of FIG. 3) may be ignored, recalculated or replaced by this threshold.

Peaks appearing between these two thresholds (304 and 306) can be analyzed, sorted and/or selected 515 depending on their broadening, on their frequency and on other processing considerations related to data analysis (e.g., correlation length, duration, etc.). A cut-off a higher ratio threshold may be applied 517 or re-adjusted after continued analysis. Once a broad peak in a spectrum is selected, all associated points may be localised on a map and define a certain amplitude at a defined locations of the campaign. Plotting and interpolating these amplitudes or related functions of these amplitudes, typically minimum, maximum, average, produces a maps and related data. For example, one map per selected peak over a survey or campaign area may be displayed.

So to summarize one embodiment, a campaign spectrum is produced by combining the acquired data 501, sorting into block of selected time periods 503, applying a transform and optionally smoothing the spectra 505, extracting the normalised ratio for a selected peak 507 and displaying the ratio versus frequency data for the peaks selected for analysis 509. Relevant peaks and amplitudes are identified by a lower threshold 511 and upper threshold 513 that are selected. The broad peaks selected from these results are selected 515 for mapping associated frequency-ratio pair data by location. Frequency-pair ratio data above the higher threshold 306 may be cut-off, deleted or recalculated 517. Alternatively the higher ratio threshold may be readjusted. Maps may be displayed 519 for each selected peak. An example of a map is for an average ratio for (VMax/((VL+VR)/2)) a various frequencies plotted for an acquisition campaign.

While data may be acquired with multi-component earthquake seismometer equipment with large dynamic range and enhanced sensitivity, many different types of sensor instruments can be used with different underlying technologies and varying sensitivities. Sensor positioning during recording may vary, e.g. sensors may be positioned on the ground, below the surface or in a borehole. The sensor may be positioned on a tripod or rock pad. Sensors may be enclosed in a protective housing for ocean bottom placement. Wherever sensors are positioned, good coupling results in better data. Recording time may vary, e.g. from minutes to hours or days. In general terms, longer-term measurements may be helpful in areas where there is high ambient noise and provide extended periods of data with fewer noise problems.

The layout of a survey may be varied, e.g. measurement locations may be close together or spaced widely apart and different locations may be occupied for acquiring measurements consecutively or simultaneously. Simultaneous recording of a plurality of locations may provide for relative consistency in environmental conditions that may be helpful in ameliorating problematic or localized ambient noise not related to subsurface characteristics.

Figure 6:
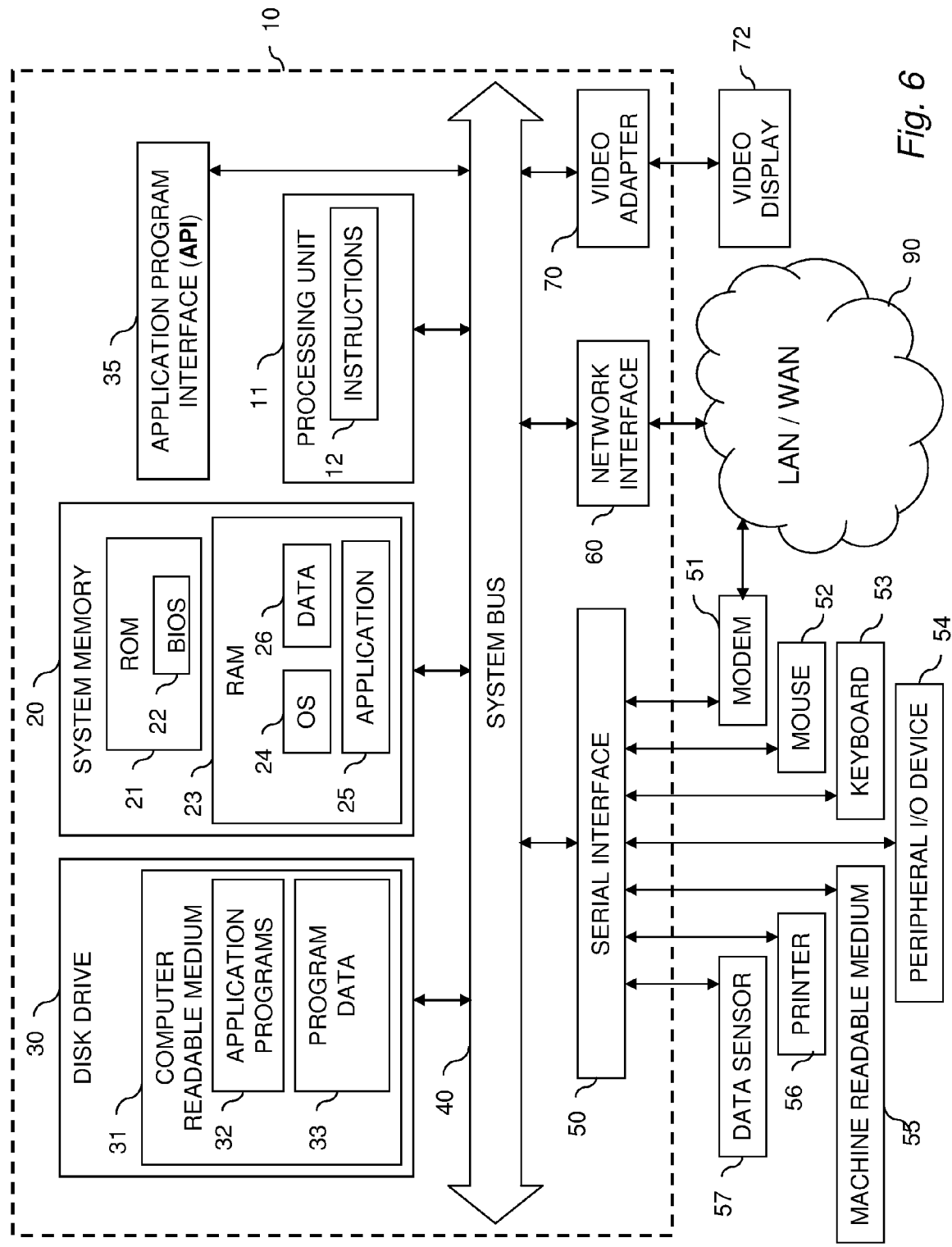
FIG. 6 is diagrammatic representation of a machine in the form of a computer system within which a set of instructions, when executed may cause the machine to perform any one or more of the methods and processes described herein.

FIG. 6 illustrates a schematic example of the hardware and operating environment for which embodiments as described herein and their equivalents may be practiced. The description of FIG. 6 includes a general description of computer hardware, computing environment or information handling system for which the embodiments may be implemented. Although specific hardware may not be required, embodiments may be implemented in the general context of computer-executable instructions, such as program modules, being executed by a computer. Various embodiments may be practiced with a personal computer, a mainframe computer or combinations that include workstations with servers. Program modules include routines, programs, objects, components and data structures for performing tasks, processing data, and recording and displaying information.

The products as defined herein may be particularly adapted for use in what are termed "information handling system." An information handling system is any instrumentality or aggregate of instrumentalities primarily designed to compute, classify, process, transmit, receive, retrieve, originate, switch, store, display, manifest, measure, detect, record, reproduce, handle or utilize any form of information, intelligence or data for business, scientific, control or other purposes. Examples include personal computers and larger processors such as servers, mainframes, etc, and may contain elements illustrated in FIG. 6.

Embodiments may be practiced with various computer or information handling system configurations that separately or in combination may include hand-held devices, multiprocessor systems, microprocessor-based or programmable consumer electronics, network computers, minicomputers, mainframe computers, and the like. Embodiments may be practiced with tasks performed in and over distributed computing environments that include remote processing devices linked through a communications network. Program modules operating in distributed computing environments may be located in various memory locations, both local and remote.

FIG. 6 is illustrative of hardware and an operating environment for implementing a general purpose computing device or information handling system in the form of a computer 10. Computer 10 includes a processor or processing unit 11 that may include 'onboard' instructions 12. Computer 10 has a system memory 20 attached to a system bus 40 that operatively couples various system components including system memory 20 to processing unit 11. The system bus 40 may be any of several types of bus structures using any of a variety of bus architectures as are known in the art.

While one processing unit 11 is illustrated in FIG. 6, there may be a single central-processing unit (CPU) or a graphics processing unit (GPU), or both or a plurality of processing units. Computer 10 may be a standalone computer, a distributed computer, or any other type of computer.

System memory 20 includes read only memory (ROM) 21 with a basic input/output system (BIOS) 22 containing the basic routines that help to transfer information between elements within the computer 10, such as during start-up. System memory 20 of computer 10 further includes random access memory (RAM) 23 that may include an operating system (OS) 24, an application program 25 and data 26.

Computer 10 may include a disk drive 30 to enable reading from and writing to an associated computer or machine readable medium 31. Computer readable media 31 includes application programs 32 and program data 33.

For example, computer readable medium 31 may include programs to process seismic data, which may be stored as program data 33, according to the methods disclosed herein. The application program 32 associated with the computer readable medium 31 includes at least one application interface for receiving and/or processing program data 33. The program data 33 may include seismic data acquired according to embodiments disclosed herein. At least one application interface may be associated with calculating a ratio of data components, which may be spectral components, for locating subsurface hydrocarbon reservoirs.

The disk drive may be a hard disk drive for a hard drive (e.g., magnetic disk) or a drive for a magnetic disk drive for reading from or writing to a removable magnetic media, or an optical disk drive for reading from or writing to a removable optical disk such as a CD ROM, DVD or other optical media.

Disk drive 30, whether a hard disk drive, magnetic disk drive or optical disk drive is connected to the system bus 40 by a disk drive interface (not shown). The drive 30 and associated computer-readable media 31 enable nonvolatile storage and retrieval for one or more application programs 32 and data 33 that include computer-readable instructions, data structures, program modules and other data for the computer 10. Any type of computer-readable media that can store data accessible by a computer, including but not limited to cassettes, flash memory, digital video disks in all formats, random access memories (RAMs), read only memories (ROMs), may be used in a computer 10 operating environment.

The application programs 32 may be associated with one or more application program interfaces. An application programming interface (API) 35 may be an interface that a computer system, library or application provides in order to allow requests for services to be made of it by other computer programs, and/or to allow data to be exchanged between them. An API 35 may also be a formalized set of software calls and routines that can be referenced by an application program 32 in order to access supporting application programs or services, which programs may be accessed over a network 90.

APIs 35 are provided that allow for higher level programming for displaying and mapping subsurface reservoirs. For example, APIs are provided for receiving seismic data, and decomposing, merging, smoothing and averaging the data. Moreover, the APIs allow for receiving the frequency product data and storing it for display.

Data input and output devices may be connected to the processing unit 11 through a serial interface 50 that is coupled to the system bus. Serial interface 50 may a universal serial bus (USB). A user may enter commands or data into computer 10 through input devices connected to serial interface 50 such as a keyboard 53 and pointing device (mouse) 52. Other peripheral input/output devices 54 may include without limitation a microphone, joystick, game pad, satellite dish, scanner or fax, speakers, wireless transducer, etc. Other interfaces (not shown) that may be connected to bus 40 to enable input/output to computer 10 include a parallel port or a game port. Computers often include other peripheral input/output devices 54 that may be connected with serial interface 50 such as a machine readable media 55 (e.g., a memory stick), a printer 56 and a data sensor 57. A seismic sensor or seismometer for practicing embodiments disclosed herein are nonlimiting examples of data sensor 57. A video display 72 (e.g., a liquid crystal display (LCD), a flat panel, a solid state display, or a cathode ray tube (CRT)) or other type of output display device may also be connected to the system bus 40 via an interface, such as a video adapter 70. A map display created from spectral ratio values as disclosed herein may be displayed with video display 72.

A computer 10 may operate in a networked environment using logical connections to one or more remote computers. These logical connections are achieved by a communication device associated with computer 10. A remote computer may be another computer, a server, a router, a network computer, a workstation, a client, a peer device or other common network node, and typically includes many or all of the elements described relative to computer 10. The logical connections depicted in FIG. 6 include a local-area network (LAN) or a wide-area network (WAN) 90. However, the designation of such networking environments, whether LAN or WAN, is often arbitrary as the functionalities may be substantially similar. These networks are common in offices, enterprise-wide computer networks, intranets and the Internet.

When used in a networking environment, the computer 10 may be connected to a network 90 through a network interface or adapter 60. Alternatively computer 10 may include a modem 51 or any other type of communications device for establishing communications over the network 90, such as the Internet. Modem 51, which may be internal or external, may be connected to the system bus 40 via the serial interface 50.

In a networked deployment computer 10 may operate in the capacity of a server or a client user machine in server-client user network environment, or as a peer machine in a peer-to-peer (or distributed) network environment. In a networked environment, program modules associated with computer 10, or portions thereof, may be stored in a remote memory storage device. The network connections schematically illustrated are for example only and other communications devices for establishing a communications link between computers may be used.

In one embodiment a method of locating subsurface hydrocarbon reservoirs includes acquiring seismic data, dividing the seismic data into time windows, decomposing the seismic data to obtain a data spectrum, selecting a first local amplitude minimum of the data spectrum and an adjacent local amplitude maximum, multiplying the local amplitude value maximum by a function of the local amplitude minimum to obtain a frequency product and recording the frequency product in a form for display.

In a further aspect the function of the local amplitude minimum may be an inverse of the first local amplitude minimum or an inverse of an average value of the local amplitude minimum combined with a second local amplitude minimum. Also, a plurality of orthogonal components of the acquired seismic data may be merged to obtain a merged data component. The square root of the sum of the squares of the plurality of orthogonal components may be used to merged the data. The data spectrum may be smoothed or averaged over a plurality of time windows. The data may be displayed as a 2D or 3D map, and the values may be contoured or otherwise formulated for areal display.

In another embodiment a method of locating subsurface hydrocarbon reservoirs includes acquiring seismic data having a plurality of orthogonal components, dividing the seismic data into time windows, decomposing the seismic data to obtain a data spectrum, selecting a local amplitude maximum of the data spectrum and adjacent local amplitude minimums either side of the first local amplitude maximum, multiplying the local amplitude value maximum by a function of at least one of the adjacent local amplitude minimums either side of the first local amplitude maximum to obtain a frequency product and recording and storing the frequency product data in a form for display.

In another aspect the function of the local amplitude minimum includes an inverse of an average of combined values of the adjacent local amplitude minimums. At least two of a plurality of orthogonal data components may be merged. Merging may include determining the square root of the sum of the squares of the plurality of components. The data spectrum may be smoothed or averaged over a plurality of time windows. The frequency product may be displayed as a map.

In still another embodiment a set of application program interfaces are embodied on a computer readable medium for execution by a processor for calculating a frequency product for locating subsurface reservoirs. The interfaces include a first interface that receives seismic data, a second interface that receives data from a data transform applied to the seismic data to obtain a data spectrum, a third interface that receives a frequency product that is a function of a local amplitude value maximum multiplied by a function of at least one of the adjacent local amplitude minimums either side of the local amplitude maximum to obtain a frequency product and a fourth interface that records the frequency product in a form for display.

A fifth interface may receive data wherein the seismic data are divided into time windows. The function of the local amplitude minimums for the third interface may include an inverse of an average of combined values of the adjacent local amplitude minimums. A sixth interface may receive a smoothed data spectrum. A seventh interface may receive data from the data spectrum averaged over a plurality of time windows. An eighth interface may receive merged orthogonal components of the seismic data.

In another embodiment a method of processing seismic data includes decomposing seismic data to obtain a spectral component over a selected frequency range. For the spectral component a local amplitude maximum and a first adjacent local amplitude minimum are selected. The local amplitude value maximum is multiplied by a function of the first adjacent local amplitude minimum to obtain a frequency-ratio pair and recorded in a form for display.

The method may include selecting a lower ratio threshold and selecting a higher ratio threshold and selecting a broad peak frequency location of frequency-ratio pair data between the lower and higher ratio thresholds. The frequency-ratio pair for a selected frequency may be displayed as a map over an area associated with the seismic data. The method may include displaying a broad peak of frequency-ratio pair data between the lower and higher ratio thresholds for a plurality of frequencies. The function of the local amplitude minimum may include an inverse of the first adjacent local amplitude minimum or an inverse of a combination of the first adjacent local amplitude minimum combined with a second adjacent local amplitude minimum. The spectral component may be determined by applying a data transform to a plurality of orthogonal components of motion for the naturally occurring low frequency background seismic data. Decomposing seismic data may include smoothing the data for the spectral component.

In another embodiment an information handling system for mapping an area associated with seismic data includes a processor configured to decompose seismic data to obtain a spectral component over a selected frequency range and is configured to multiply a local amplitude value maximum of the spectral component over a selected frequency range by a function of a first adjacent local amplitude minimum to obtain a frequency-ratio pair. The system also includes a computer readable medium for storing the frequency-ratio pair. The processor may be configured to determine the function of the first adjacent local amplitude minimum as an inverse of the first adjacent local amplitude minimum or an inverse of a combination of the first adjacent local amplitude minimum combined with a second adjacent local amplitude minimum. The system's processor may be configured to determine broad peak frequency location of frequency-ratio pair data between a lower ratio threshold and a higher ratio threshold. A graphical display may be coupled to the processor and configured to present a view of the frequency-ratio pair as a function of position, wherein the processor is configured to generate the view by contouring the frequency-ratio over an area associated with the seismic data.

Figure 7:
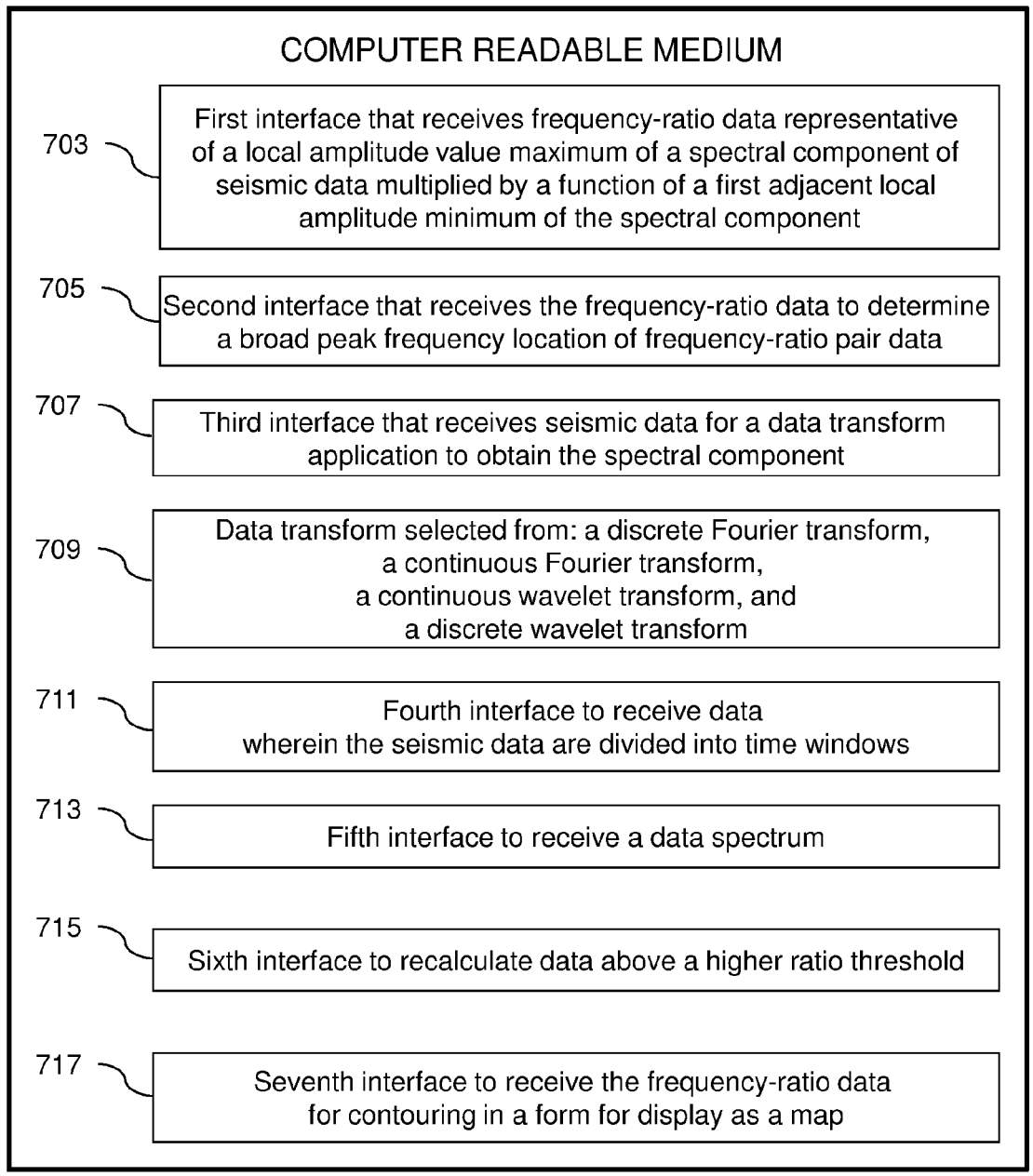
FIG. 7 illustrates a set of application program interfaces according to an embodiment of the present disclosure.
Figure 8:
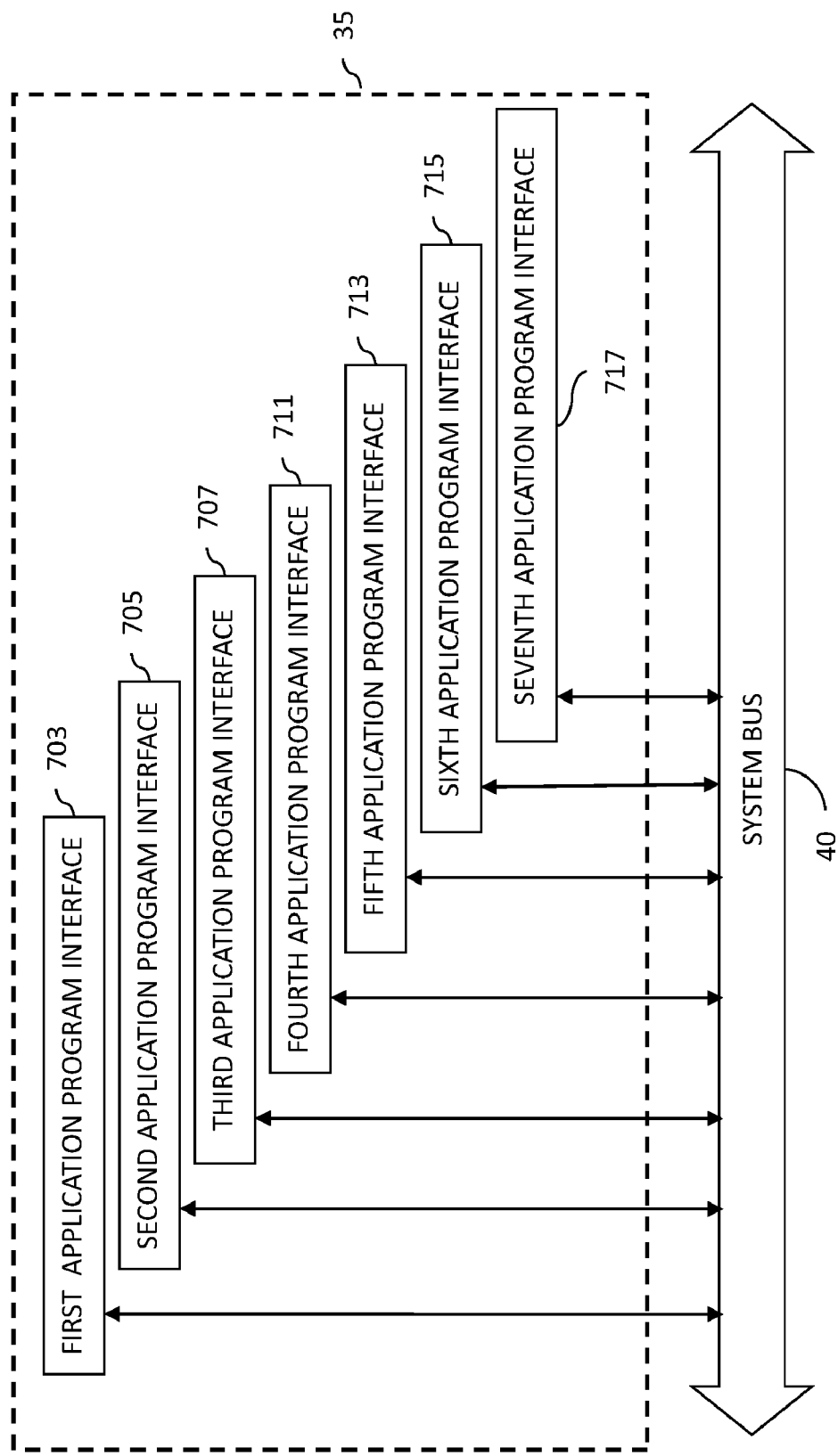
FIG. 8 illustrates a block diagram of a set of application program interfaces according to an embodiment of the present disclosure.

In another embodiment, as illustrated in FIG. 7 and the block diagram of FIG. 8, a set of application program interfaces, 35, associated with an application program for seismic data processing are embodied on a machine readable medium for execution by a processor in conjunction with an application program for processing seismic data. The interfaces include a first application program interface, 703, that receives frequency-ratio data representative of a local amplitude value maximum of a spectral component of seismic data multiplied by a function of a first adjacent local amplitude minimum of the spectral component. A second application program interface, 705, receives the frequency-ratio data to determine broad peak frequency location of frequency-ratio pair data.

The set of application interface programs may also include a third application program interface, 707, that receives seismic data for a data transform to obtain a spectral component. The data transform, 709, may be a discrete Fourier transform, a continuous Fourier transform, a continuous wavelet transform or a discrete wavelet transform. The function of the first adjacent local amplitude minimum for the first application program interface may include an inverse of the first adjacent local amplitude minimum or an inverse of a combination of the first adjacent local amplitude minimum combined with a second adjacent local amplitude minimum. A fourth application program interface, 711, receives seismic data divided into time windows. A fifth application program interface, 713, receives a smoothed data spectrum. A sixth application program interface, 715, may receive data from the data spectrum averaged over a plurality of time windows. A seventh application program interface, 717, may receive the frequency-ratio data for contouring in a form for display as a map.

While various embodiments have been shown and described, various modifications and substitutions may be made thereto without departing from the spirit and scope of the disclosure herein. Accordingly, it is to be understood that the present embodiments have been described by way of illustration and not limitation.

The invention claimed is:

1. A method of processing seismic data comprising:
decomposing seismic data using a processing unit to obtain a spectral component over a selected frequency range;
selecting, using the processing unit, a local amplitude maximum of the spectral component and selecting, using the processing unit, a first adjacent local amplitude minimum;
multiplying, using the processing unit, the local amplitude value maximum by a function of the first adjacent local amplitude minimum to obtain frequency-ratio pair data; and
recording the frequency-ratio pair data in a form for display.

2. The method of claim 1 further comprising selecting a lower ratio threshold and selecting a higher ratio threshold and selecting a broad peak frequency location of frequency-ratio pair data between the lower and higher ratio thresholds.

3. The method of claim 2 wherein recording the frequency-ratio pair data in a form for display further comprises: displaying the broad peak of frequency-ratio pair data between the lower and higher ratio thresholds for a plurality of frequencies.

4. The method of claim 1 further comprising displaying the frequency-ratio pair data as a map over an area associated with the seismic data.

5. The method of claim 1 wherein the function of the local amplitude minimum further comprises one of i) an inverse of the first adjacent local amplitude minimum and ii) an inverse of a combination of the first adjacent local amplitude minimum combined with a second adjacent local amplitude minimum.

6. The method of claim 1 wherein the spectral component is obtained by: applying a data transform to a plurality of orthogonal components of motion for the naturally occurring low frequency background seismic data.

7. The method of claim 1 wherein decomposing seismic data further comprises smoothing the spectral component.

8. An information handling system for mapping an area associated with seismic data comprising:
a processor configured to decompose seismic data to obtain a spectral component and configured to multiply a local amplitude value maximum of the spectral component by a function of a first adjacent local amplitude minimum to obtain frequency-ratio pair data; and
a non-transitory computer readable medium for storing the frequency-ratio pair data.

9. The information handling system of claim 8 wherein the processor configured to apply a data transform to the seismic data uses a data transform selected from the group consisting of: a discrete Fourier transform, a continuous Fourier transform, a continuous wavelet transform, and a discrete wavelet transform.

10. The information handling system of claim 8 wherein the processor is configured to determine the function of the first adjacent local amplitude minimum as at least one selected from the group comprising: i) an inverse of the first adjacent local amplitude minimum and ii) an inverse of a combination of the first adjacent local amplitude minimum combined with a second adjacent local amplitude minimum.

11. The information handling system of claim 8 wherein the processor is configured to determine a broad peak frequency location of frequency-ratio pair data between a lower ratio threshold and a higher ratio threshold.

12. The information handling system of claim 8 further comprising: a graphical display coupled to the processor and configured to present a view of the frequency-ratio pair as a function of position, wherein the processor is configured to generate the view by contouring the frequency-ratio over an area associated with the seismic data.

13. A set of application program interfaces embodied on a non-transitory computer readable medium for execution by a processor in conjunction with an application program for processing seismic data, the set of application program interfaces comprising:
a first application program interface associated with the application program for processing seismic data that receives, from the application program, frequency-ratio pair data representative of a local amplitude value maximum of a spectral component of seismic data multiplied by a function of a first adjacent local amplitude minimum of the spectral component; and a second application program interface associated with the application program for processing seismic data that receives, from the first application program interface, the frequency-ratio pair data to determine a broad peak frequency location of the frequency-ratio pair data.

14. The set of application program interfaces according to claim 13 further comprising: a third application program interface associated with the application program for processing seismic data that receives seismic data for a data transform application to obtain the spectral component.

15. The set of application program interfaces according to claim 13 wherein the data transform application for the third interface is selected from the group consisting of: a discrete Fourier transform, a continuous Fourier transform, a continuous wavelet transform, and a discrete wavelet transform.

16. The set of application program interfaces according to claim 13 wherein the function of a first adjacent local amplitude minimum for the first interface further comprises at least one selected from the group comprising: i) an inverse of the first adjacent local amplitude minimum and ii) an inverse of a combination of the first adjacent local amplitude minimum combined with a second adjacent local amplitude minimum.

17. The set of application program interfaces according to claim 13 further comprising a fourth application program interface associated with the application program for processing seismic data to receive seismic data wherein the seismic data are divided into time windows.

18. The set of application program interfaces according to claim 13 further comprising a fifth application program interface associated with the application program for processing seismic data to receive a data spectrum.

19. The set of application program interfaces according to claim 13 further comprising a sixth application program interface associated with the application program for processing seismic data to recalculate data above a higher ratio threshold.

20. The set of application program interfaces according to claim 13 further comprising a seventh application program interface associated with the application program for processing seismic data to receive the frequency-ratio data for contouring in a form for display as a map.

* * * * *